United States Patent [19]

Welman

[11] Patent Number: 4,510,385

[45] Date of Patent: Apr. 9, 1985

[54] SOLAR TRACKING SYSTEM EMPLOYING INERTIAL COASTING

[75] Inventor: Cornelis M. Welman, Huntington Beach, Calif.

[73] Assignee: Mattel, Inc., Hawthorne, Calif.

[21] Appl. No.: 439,659

[22] Filed: Nov. 8, 1982

[51] Int. Cl.³ .............................................. G01J 1/24
[52] U.S. Cl. ................................. 250/203 R; 126/425
[58] Field of Search ................... 250/203 S, 203 R; 126/424, 425, 440; 136/246

[56] References Cited

U.S. PATENT DOCUMENTS

| | | | |
|---|---|---|---|
| 3,996,460 | 12/1976 | Smith | 250/203 S |
| 4,213,303 | 7/1980 | Lane | 126/440 X |
| 4,325,788 | 4/1982 | Snyder | 250/203 S X |

Primary Examiner—Edward P. Westin
Attorney, Agent, or Firm—Reagin & King

[57] ABSTRACT

A solar tracking system is disclosed which includes a solar powered motor coupled to a rotatable collector using a high reduction gear arrangement. The collector rotates about pivot bearings and is counterbalanced about such bearings by counterweights. A light sensor which actuates the motor when illuminated by sunlight is mounted in relation to one of the counterweights so that the counterweight casts a shadow over the sensor when the collector has moved to a position slightly before the position where the sun is aligned with the collector. At this point, the motor is de-energized and the inertia of the motor, collector and counterweights in cooperation with the gear arrangement causes the collector to coast into alignment with the sun.

8 Claims, 3 Drawing Figures

SOLAR TRACKING SYSTEM EMPLOYING INERTIAL COASTING

BACKGROUND OF THE INVENTION

This invention relates to tracking systems and, more particularly, to inexpensive solar tracking systems. Collectors, such as parabolic reflectors, have been widely used to gather solar energy and focus the rays of the sun on an object to utilize the heat from the sun.

Various means have been provided in the past to control the movement of the collector to track the path of the sun's rays. Such means have, in general, been expensive to construct and to operate, have required external power sources, and have been inefficient and inaccurate in operation. For example, prior art devices often require complicated braking mechanisms to prevent the collector from rotating out of alignment with the sun. One example of such a prior device is seen in U.S. Pat. No. 1,976,428 issued on Oct. 9, 1934 to J. M. Arthuys et al. Another example is shown in U.S. Pat. No. 4,387,702, issued June 14, 1983, and assigned to the assignee of the present application.

It is, therefore, an object of the present invention to provide a highly-accurate, simple and inexpensive control system which uses minimum power.

It is a further object of the present invention to provide a control system for a solar tracking device which automatically and continuously points the collector toward the sun's rays without the use of a braking device.

It is another object of the invention to provide an electro-mechanical drive for a tracking system which is powered by a solar charged battery and is energized by a light sensor having a restricted field of view.

It is an additional object of the present invention to further control the speed and amount of rotation of the tracking device by providing a high reduction gear train arrangement connected to and activated by the motor.

SUMMARY OF THE INVENTION

The foregoing and other objects of the invention are accomplished by an inexpensive optical/mechanical tracking device which utilizes a unique combination including a high reduction gear arrangement, counterweights, and a shielded light sensor which cooperate to control rotation of a tracking yoke and collector and to automatically maintain it pointed toward the sun.

A light sensor which controls movement of a tracking yoke is so positioned on the yoke that its exposure to the sun is limited. This arrangement of the sensor prevents rotation of the yoke until the sun reaches a point in its path of travel where sunlight falls on the sensor. At this point, the sensor energizes a motor, powered by solar charged batteries, which activates the gear arrangement causing rotation of the yoke and collector.

The sensor is mounted in relation to one of the yoke mounted counterweights so that the counterweight casts a shadow over the sensor and acts as the exposure limiter. The shadow causes the motor to be de-energized when the counterweight and the collector have moved to a position slightly before the position where the sun is focused at the collector's focal point. The inertia of the moving yoke, collector, counterweights, and motor in conjunction with the gear arrangement causes the yoke to coast after the motor is de-energized. This coasting action moves the collector to the position where the sun is focused at the collector's focal point. This rotation cycle of the collector is repeated as the sun moves and re-exposes the sensor to sunlight.

Other objects and advantages of the invention will become apparent by reference to the specification taken in conjunction with the drawings in which like reference numerals refer to like elements in the various views.

DESCRIPTION OF THE PREFERRED EMBODIMENT

Figure 1:
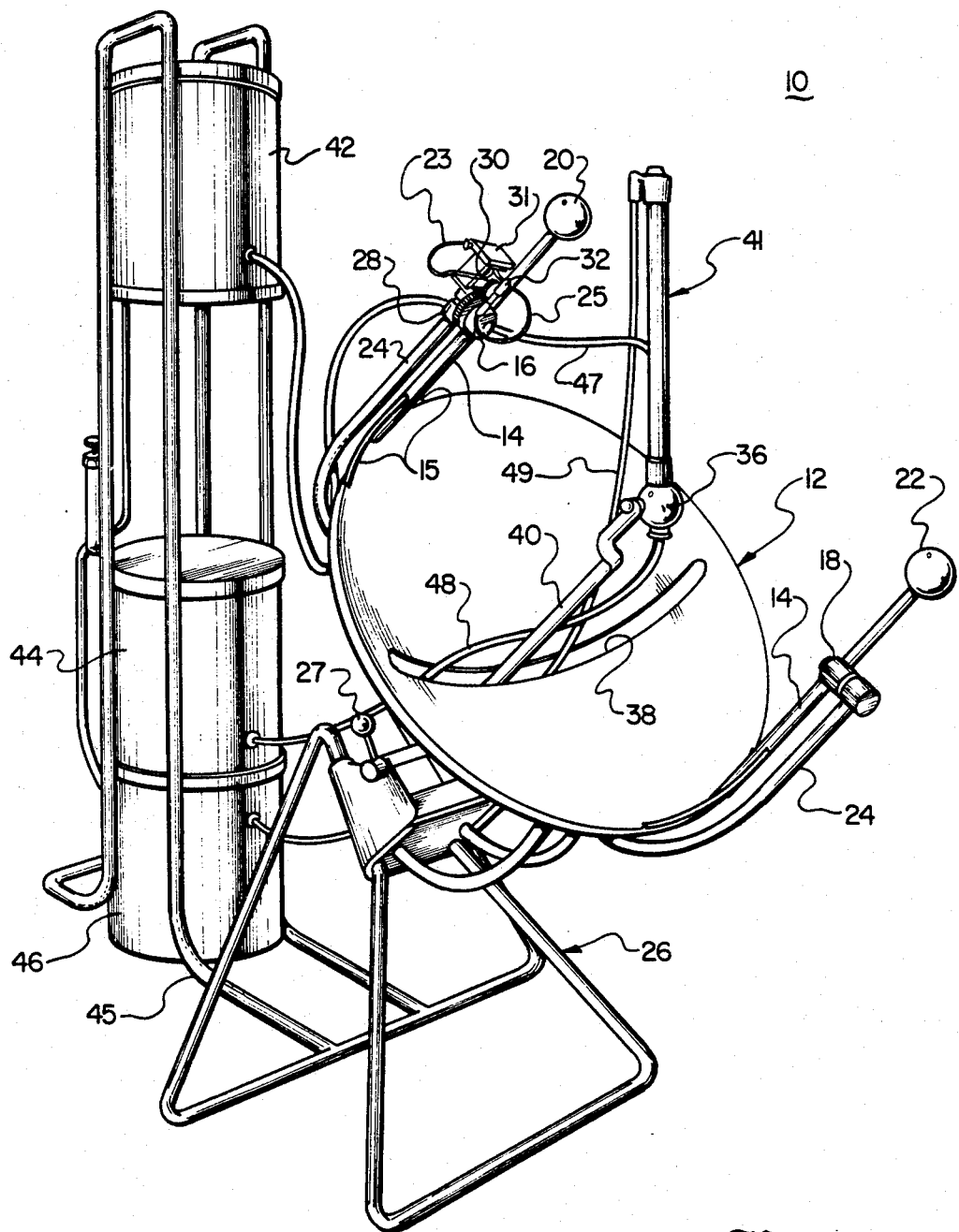
FIG. 1 is a perspective view of a solar tracking system constructed in accordance with the present invention.

Referring now to the drawings and, more particularly, to FIG. 1, there is shown a perspective view of a solar tracking system 10 constructed in accordance with this invention. The system includes a parabolic collector 12 fixedly mounted to a tracking yoke 14 and balanced about azimuth pivot bearings 16 and 18 by a pair of generally spherical counterweights 20 and 22 mounted at the uppermost extensions of the tracking yoke 14. Gusset plates 15 are provided between the collector 12 and the yoke 14 to strengthen the structure (shown more clearly in FIG. 2).

The bearings 16 and 18 rotatably couple the tracking yoke 14 to a mounting yoke 24 which is in turn pivotably secured to a base 26. A control lever 27 enables the mounting yoke to be manually pivoted with respect to the base 26. This pivoting action enables the collector 12 to be manually adjusted in elevation. The collector 12 tracks the azimuth position of the sun by rotating about the bearings 16 and 18.

Figure 2:
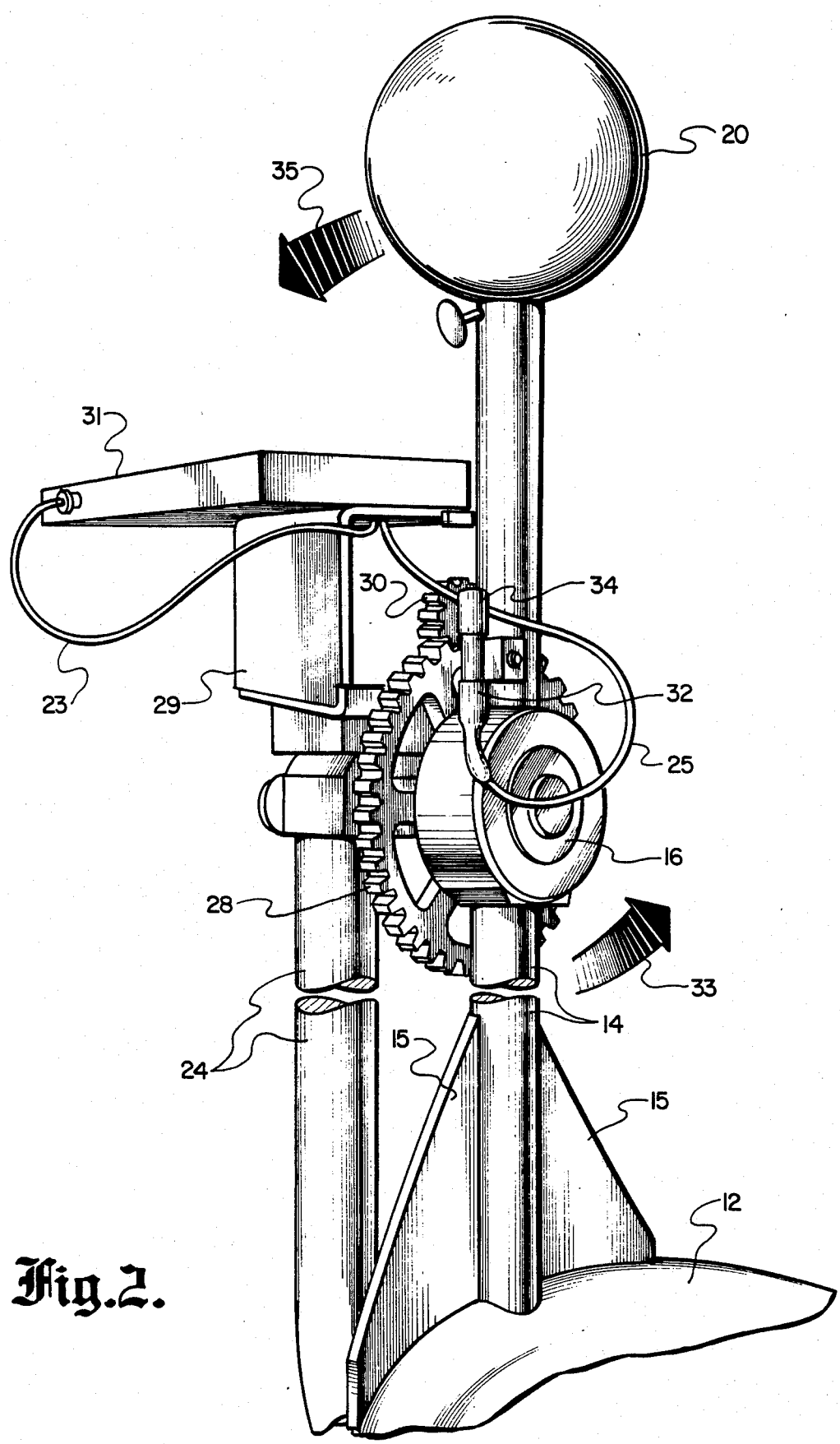
FIG. 2 is an elevational view of a portion of the yoke assembly illustrating the sensor, counterweights and reduction gear arrangement of a solar tracker constructed in accordance with the present invention.

As seen more clearly in FIG. 2, connected to the tracking yoke 14 at azimuth pivot bearing 16 is an azimuth drive gear 28 for mechanically affecting the rate of movement of the tracking yoke 14.

The gear 28 is meshed with a pinion gear 30 which is driven by a low voltage DC motor in combination with a gear train (not shown but both enclosed within a case 29 mounted to the yoke 24). The azimuth drive gear 28 has 132 teeth and the pinion gear 30 has twelve teeth, thus establishing an 11:1 speed reduction ratio. The motor and its associated gear train are selected to rotate the gear 30 at approximately eleven RPM thus causing the collector to rotate at a rate of 1 RPM. In the preferred embodiment, the motor is a 4.5 volt D.C. motor having an output shaft speed of approximately 5900 RPM. An example of such a motor is type RE-280-20120 supplied by Mabuchi Motor Co., Tokyo, Japan. The output shaft of the motor is coupled to a gear train having a 540:1 gear reduction ratio. The gear 30 is in turn coupled to the output shaft of the gear train.

The motor (not shown) is powered by an array of solar powered photovoltaic cells 31 mounted on the case 29. The motor is turned on by an output signal from a sensor 32 mounted within a long narrow tube 34 affixed to the tracking yoke 14 above the azimuth pivot bearing 16.

Figure 3:
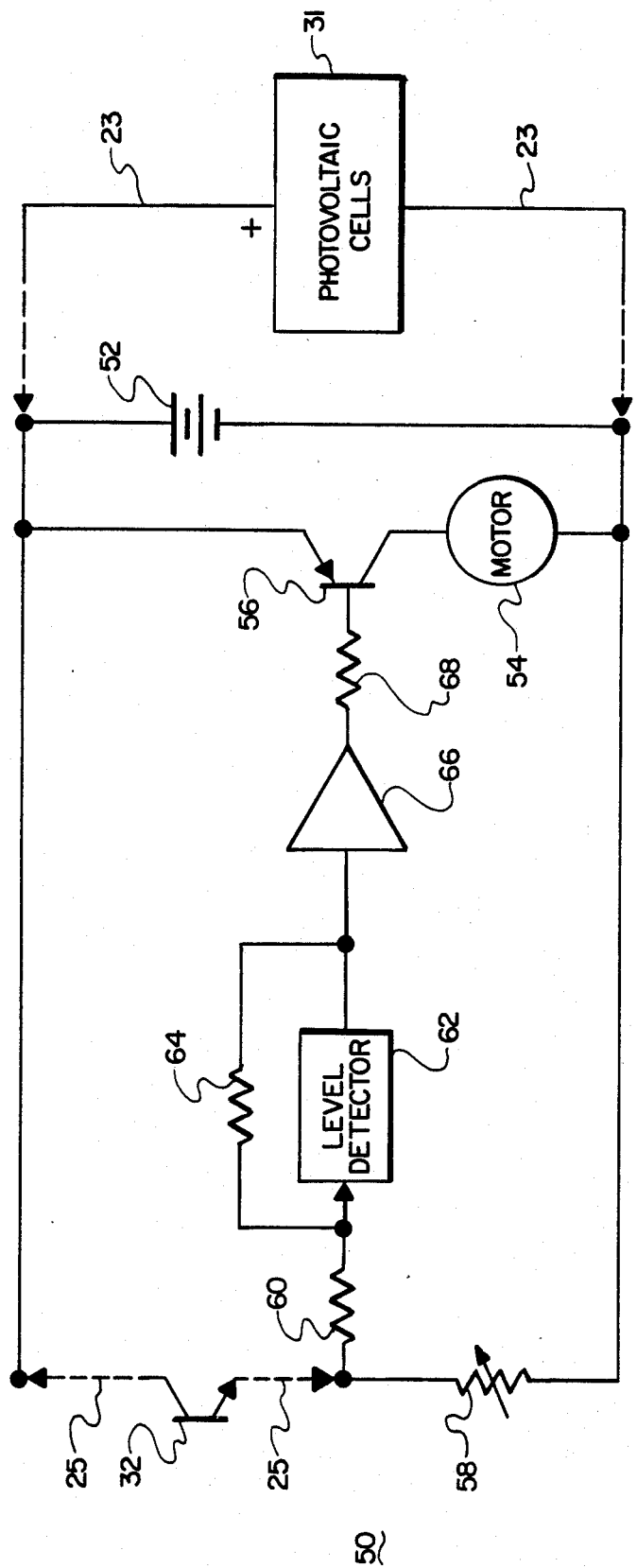
FIG. 3 is a schematic diagram of a control circuit used to control the operation of the system of FIG. 1.

FIG. 3 is a schematic diagram of a control circuit 50 mounted within the case 29 and used to control the operation of the motor. The photovoltaic cells 31 are connected to the circuit 50 using conductors 23, and the sensor 32 is connected to the circuit 50 using conductors 25. The cells 31 are connected in parallel with a rechargeable battery 52 such as a nickle-cadmium battery, and the motor 54, discussed above, is connected to the battery 52 through a transistor 56.

In the preferred embodiment, the sensor 32 is a phototransistor sensitive to sunlight. The sensor 32 is connected in series with a variable resistor 58 to form a voltage divider which is in turn connected across the terminals of the battery 52. The junction of the emitter terminal of the sensor 32 and one end of the resistor 58 is connected through a resistor 60 to an input terminal of a level detector 62. A feedback resistor 64 is connected from the output terminal to the input terminal of the detector 62. The resistors 60 and 64 are used to set the threshold voltage of the detector 62 in a manner well known to those skilled in the art. The output terminal of the detector 62 is connected to an input terminal of an amplifier 66. The output terminal of the amplifier buffer 66 is in turn connected through a bias resistor 68 to the base terminal of the transistor 56. Both the detector 62 and the amplifier 66 derive their operating power from the battery 52.

The operating of the control circuit 50 is as follows. The battery 52 is maintained in a charged state by the output power from the photovoltaic cells 31 produced during sunlight hours. When sunlight impinges on the sensor 32 it is biased into conduction and causes the voltage appearing at the input terminal of the detector 62 to increase. When this voltage exceeds the threshold voltage of the detector 62, a positive voltage appears at its output terminal. This voltage is amplified by the amplifier 66 and acts to bias the transistor 56 into conduction. When transistor 56 conducts, the motor 54 is energized.

When no light is impinging on the sensor 32, the voltage appearing at the input terminal of the detector 62 is below its threshold voltage. Consequently, the detector 62 no longer produces a positive output voltage, the transistor 56 is no longer biased into conduction, and the motor 54 is deenergized. The variable resistor 58 may be used to adjust the sensitivity of the circuit 50. The value of the resistor 58 determines the amount of light impinging on the sensor 32 which is necessary to cause the motor 54 to be energized.

Returning to FIG. 2, it may be seen that the sensor 32 is mounted within the tube 34 below the counterweight 20. The counterweight 20 in cooperation with the tube 34 shields the sensor 32 from sunlight when the focal point of the collector is within approximately two degrees of pointing at the sun. Under this condition, the sensor 32 is prevented from transmitting a signal to energize the motor. When the sun has moved so that a sufficient amount of the sensor 32 is out of the shadow of the counterweight 20, the sensor 32 energizes the motor. The motor causes the collector to move in the direction of arrow 33 in FIG. 2, while the counterweight 20 moves in the direction of arrow 35, which is also the direction of movement of the sun.

In the preferred embodiment, the sensor 32 is mounted so that its axis is approximately fifteen degrees ahead of the axis of the collector 12. When the light from the sun hits the sensor 32 and energizes the motor, the pinion gear 30 rotates the gear 28 and, with it, the tracking yoke 14. As the yoke 14 moves, so do the counterweights 20 and 22. The shadow of the counterweight 20 remains beyond the sensor 32 until the collector axis approaches to within a few degrees of pointing at the sun. At this point the counterweight 20 casts a shadow over the phototransistor 32, de-energizing the motor. However, the inertia of the collector 12, the motor, the yoke 14, and the counterweights 20 and 22 in conjunction with the associated gears, causes the yoke 14 to coast for a few degrees bringing the collector axis into almost perfect alignment with the sun.

In the preferred embodiment, the collector 12 weighs approximately 30 pounds, and has a diameter of approximately four feet. Each of the counterweights 20 and 22 weigh fifteen pounds, and are positioned to balance the collector 12 about the bearings 16 and 18.

After the arrangement has dissipated its inertia, it stops so that the shadow from the counterweight 20 on the phototransistor 32 causes it to remain in an "off" condition until the sun again advances so that the shadow from the counterweight 20 recedes from the phototransistor 32. At this point, the sensor 32 again receives sunlight and re-energizes the motor to rotate the collector 12.

Thus, the control circuit in conjunction with the coasting action acts to cycle the motor on and off. In a preferred embodiment, the system cycles approximately every five minutes throughout the day. In this embodiment, the approximately five minute rate results in a control system exhibiting a pointing error of approximately two degrees. It will be appreciated that the counterweight 20 might be constructed of larger or smaller size to alter the cycling rate without subsequent adverse effect upon focus accuracy.

Referring again to FIG. 1, the heat collected from the sun by the collector 12 may be directed to a boiler 36 and distillation column 41, or other heating device, which may be mounted to the base 26 through an arcuate slot 38 in the collector 12 by a support bar 40. Flexible tubes 47, 48, and 49 may be used to connect the boiler 36 and column 41 to storage tanks such as those at 42, 44, and 46, respectively (shown in FIG. 1 for illustrative purposes only). A frame 45 used to support the tanks 42, 44, and 46 may be joined to the base 26 to increase the mechanical stability of the collector 12 to avoid tipping in the event high winds are present.

The collector's azimuth position may be manually reset at the end of each day without having to fully disengage the drive by incorporating a friction clutch (not shown) between the pinion 30 and the gear train inside the case 29.

While there has been shown and described a preferred embodiment, it is to be understood that various other adaptations and modifications may be made which fall within the spirit and scope of this invention.

What is claimed is:

1. In a solar tracking system including a fixed-support, collector means for collecting the sun's rays along an axis, pivot bearings for rotatably attaching the collector means to the support, motive means for applying a force to rotate the collector means, and sun sensor means for energizing the motive means when exposed to sunlight, the improvement comprising:

shadow producing means mounted to rotate with the collector means for preventing the exposure of the sun sensor to sunlight when the axis of the collector means approaches the position of the sun to within a predetermined angle; and means for coupling the motive means to the collector means so that the inertia of the motive means, the collector means and the shadow producing means causes the collector means to coast about the pivot bearings an amount substantially equal to the predetermined angle when the motive means is de-energized.

2. The system of claim 1 in which the shadow producing means includes a counterweight used to counterbalance the collector means about the pivot bearings.

3. The system of claim 1 in which the motive means includes a motor, and the means for coupling includes a high reduction gear train for coupling the motor to the collector means.

4. The system of claim 1 in which the collector means is a parabolic collector.

5. A solar tracking system including a mounting yoke attached to a fixed base, a parabolic collector mounted to a tracking yoke; first and second pivot bearings for rotatably attaching the tracking yoke to the mounting yoke so that the collector may rotate to track the azimuth position of the sun; first and second counterweights mounted to the tracking yoke to counterbalance the collector about the pivot bearings; a solar sensor mounted within a tube which is attached to the tracking yoke in a position which causes the first counterweight to cast a shadow over the sensor when the collector axis approaches the position of the sun to within a predetermined angle; a motor; solar cells for powering the motor; means for connecting the sensor to the motor and the solar cells so that the motor is energized whenever the sensor is exposed to sunlight; and a gear reducer for coupling the motor to the tracking yoke to rotate the tracking yoke when the motor is energized and to permit the tracking yoke to coast about the pivot bearings an amount substantially equal to the predetermined angle when the motor is de-energized.

6. The system of claim 5 in which the counterweights are spherical.

7. The system of claim 5 in which the predetermined angle is two degrees.

8. The system of claim 5 in which the motor output shaft rotates at approximately 5900 RPM, and the gear reducer reduces the motor speed so that the tracking yoke is driven at approximately 1 RPM.

* * * * *